United States Patent
Weng

(10) Patent No.: US 7,349,142 B2
(45) Date of Patent: Mar. 25, 2008

(54) ELECTROCHROMIC DEVICE

(75) Inventor: Wei-Hsiang Weng, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 189 days.

(21) Appl. No.: 11/254,413

(22) Filed: Oct. 20, 2005

(65) Prior Publication Data
US 2006/0087714 A1 Apr. 27, 2006

(30) Foreign Application Priority Data
Oct. 22, 2004 (TW) .............................. 93216838 U

(51) Int. Cl.
*G02F 1/15* (2006.01)
(52) U.S. Cl. .................................................. 359/265
(58) Field of Classification Search ................ 359/265, 359/266, 267, 268, 269, 270, 271, 272, 273, 359/274, 275; 345/105, 107
See application file for complete search history.

(56) References Cited

U.S. PATENT DOCUMENTS 5,086,351 A 2/1992 Couput et al.

6,606,184 B2 * 8/2003 Guarr et al. ................ 359/265

* cited by examiner

*Primary Examiner*—Hung Dang
*Assistant Examiner*—Tuyen Tra
(74) *Attorney, Agent, or Firm*—Jeffrey T. Knapp

(57) ABSTRACT

An electrochromic component (3) generally includes: a first electrode (30), an opposite second electrode (32); a electrically conductive polymer layer (34) provided on the second electrode and facing the first electrode; and a gas chamber (36) for receiving a working gas (40), the gas chamber being defined between the first and second electrodes. The working gas is capable of having an electrochromic reation with the polymer layer under an electric field applied by the first and second electrodes. The polymer layer may be made of at least one material chosen from the group of polyacetylene, polypyrrole, and polyaniline. The working gas may be one of an oxidizing gas and a reducing gas. For example, the working gas can be oxygen gas or hydrogen gas. Advantageously, the gas chamber includes a working gas inlet and a working gas outlet.

11 Claims, 1 Drawing Sheet

ELECTROCHROMIC DEVICE

BACKGROUND OF THE INVENTION

1. Field of the Invention

The present invention relates to an electrochromic device.

2. Discussion of the Related Art

Electrochromic materials are materials which are capable of changing a color in reaction to an application of an electrical current. Specifically, the application of an electric current thereto effects an electrochemical reaction within such a material, thereby changing the color thereof.

A typical electrochromic device includes a laminated structure. The laminated structure includes an electrolyte ion conducting layer, an electrochromic layer, and a counter electrode layer. The electrolyte ion conducting layer is sandwiched between the electrochromic layer and the counter electrode layer. The laminated structure is then sandwiched between a pair of electrically conductive electrodes which are generally made of indium-tin oxide.

As is known, $WO_3$ may change from a transparent state to a colored state. Therefore, many traditional electrochromic devices employ $WO_3$ in the electrochromic layers. For instance, an electrochromic device employing $WO_3$ as the electrochromic layer material includes a multilayer structure interposed between two glass plates. The multilayer structure sequentially includes: a first indium-tin oxide layer, a $WO_3$ layer (i.e., the electrochromic layer), a $Ta_2O_5$ layer, a nickel oxide layer, and a second indium-tin oxide layer. The first and second indium-tin oxide layers function as electrodes. The $Ta_2O_5$ layer serves as an ion-introducing passage. The nickel oxide layer is configured for supplying ions. In operation, under the action of an electric field, the ions supplied by the nickel oxide layer are introduced into the $WO_3$ layer through the $Ta_2O_5$ layer, whereby the color of the $WO_3$ layer is changed.

However, the range of the color change of the $WO_3$ layer is limited. During the ion removal and/or introduction processes, some ions may be captured by other layers and thereby cannot be introduced into the $WO_3$ layer. As a result, with the amount of the ions available for activation of the $WO_3$ layer decreasing, the color-changing performance of the electrochromic device is degraded accordingly. In addition, such a device has an unduly complicated structure.

SUMMARY

An electrochromic device provided herein generally includes a first electrode, an opposite second electrode, an electrically conductive polymer layer, and a gas chamber. At least one of the first and second electrodes is light-permeable. The electrically conductive polymer layer is provided on the second electrode and faces the first electrode. The gas chamber is arranged between the first electrode and the second electrode. Furthermore, the gas chamber is configured for receiving a working gas that is capable of having an electrochromic reaction with the polymer layer under an electric field applied by the first and second electrodes.

The polymer layer may usefully be made of at least one material chosen from the group of polyacetylene, polypyrrole, and polyaniline.

The working gas may advantageously be one of an oxidizing gas and a reducing gas (i.e., a readily ionizable gas). For example, the working gas can be oxygen gas or hydrogen gas.

Each of the first and second electrodes includes a transparent conductive layer. Preferably, the transparent conductive layer is made of indium-tin oxide.

Advantageously, the gas chamber includes a working gas inlet and a working gas outlet. The electrochromic device may further include a pump, with the working gas outlet/source connected thereto.

The gas chamber may further include a plurality of separated compartments.

These and other features, aspects and advantages will become more apparent from the following detailed description and claims, and the accompanying drawing.

BRIEF DESCRIPTION OF THE DRAWING

Many aspects of the invention can be better understood with reference to the following drawing. The components in the drawing are not necessarily to scale, the emphasis instead being placed upon clearly illustrating the principles of the present invention. Moreover, in the drawing, like reference numerals designate corresponding parts throughout the several views.

DETAILED DESCRIPTION OF THE PREFERRED EMBODIMENTS

Reference will now be made to two embodiments of the present electrochromic devices, two examples of which are illustrated in the accompanying drawings.

Figure 1:
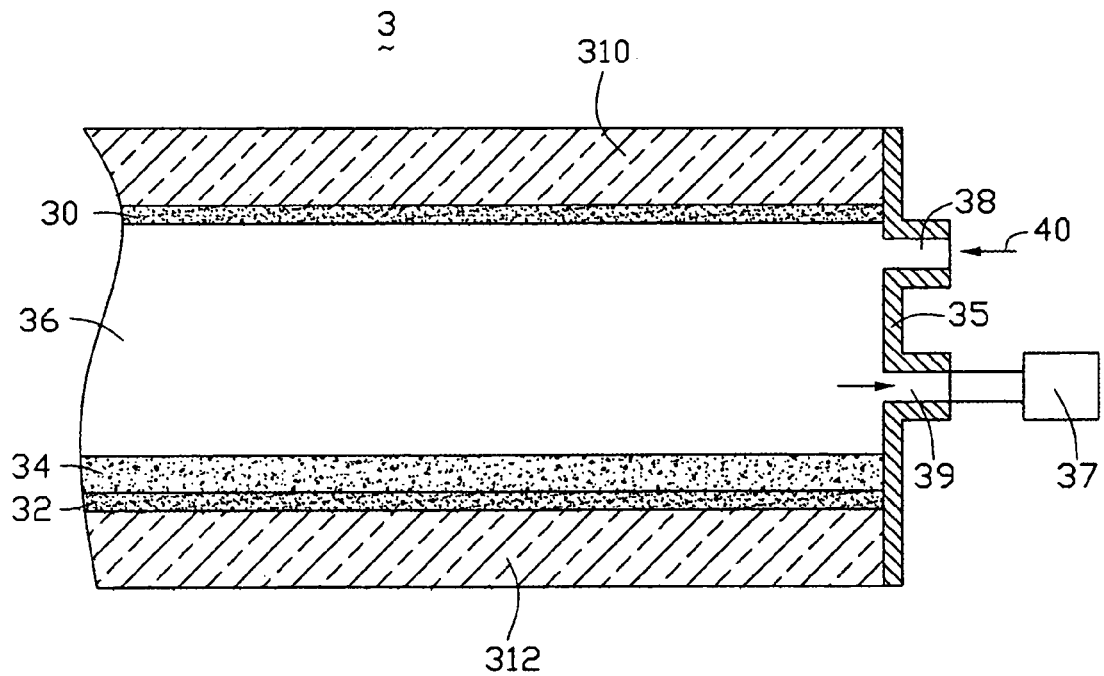
FIG. 1 is a schematic, simplified, cross-sectional view of an electrochromic device in accordance with a preferred embodiment of the present device.

Referring to FIG. 1, an electrochromic device 3 generally includes a first electrode 30, an opposite second electrode 32; an electrically conductive polymer layer (hereinafter "polymer layer") 34, and a gas chamber. The polymer layer 34 is formed on the second electrode 32 and faces the first electrode 30. The gas chamber 36 is interposed between the first electrode 30 and the polymer layer 34. The gas chamber 36 is configured for receiving a working gas 40. The first and second electrodes 30, 32 are electrically connected to a power supply via electrical wires. The electrochromic device 3 includes sidewalls 35 made of one of glass, metal, and plastic, or potentially made of a combination of such materials.

In the illustrated embodiment, the first and second electrodes 30, 32 are transparent conductive layers and are formed on two transparent substrates 310, 312, respectively. The substrates 310, 312 are made of, for example, glass, plastics, or another electrically insulating material (e.g., a ceramic material). The first and second electrodes 30, 32 may made be any of those materials known in the art to be useful as transparent conductive electrodes. The first and second electrodes 30, 32 are advantageously made of indium tin oxide. In the case of employing indium tin oxide as the material for each of the first and second electrodes 30, 32, the indium tin oxide is preferably deposited on a float glass plate.

Alternatively, one of the first and second electrodes 30, 32 is configured to be a reflective mirror, and the other is configured to be a transparent plate. The reflective mirror may be made of any of those materials known in the art to be useful as reflective conductive electrodes, such as Al, Au, or Ag, or some combination thereof.

The polymer layer 34 may be made of conductive polymer materials, such as, polyacetylene, polypyrrole, polyaniline or any combination thereof, that, advantageously, are capable of displaying electrochromic behavior. The above-mentioned conductive polymer materials have a common characteristic (i.e., molecular chains thereof are connected with conjugated bonds (i.e. alternative single and double bonds)). During an electrochemical oxidation-reduction reaction of such a conductive polymer material, due to electron transference, a new energy level is created between original band gaps of such materials. Therefore, an absorption spectrum of the molecule of such a conductive polymer material is changed accordingly. As a result, a color change of the conductive polymer material is realized.

For instance, in the case of employing polyaniline as a conductive polymer material, a molecule of the polyaniline has two or more different redox states. Therefore, the polyaniline is capable of providing a multiple color change. The color of the polyaniline may be selectively changed into any one of among a yellow color, green color, deep blue color and black color. In addition, such color change exhibitions are clear.

The polymer layer 34 can, for example, be formed on the second electrode 32 by a sputtering process. A thickness of the polymer layer 34 is determined as desired. It should be noted that the polymer layer 34 may be formed on an entire surface or part of the surface of the second electrode 32.

In accordance with the preferred embodiment, the gas chamber 36 is bounded by the first electrode 30, the second electrode 32, and the sidewalls 35, the gas chamber 36 being configured for receiving the working gas 40 therein. The polymer layer 34 is received in the gas chamber 36 and is spaced apart a distance from the first electrode 30. A plurality of spacers (not shown) may be further interposed between the first electrode 30 and the polymer layer 34, for maintaining the spacing therebetween and thus ensuring the integrity (i.e., size/shape) of the gas chamber 36.

The working gas 40 may contain one or more oxidizing gases, such as an oxygen gas. Alternatively, the working gas 40 may contain one or more reducing gases, such as a hydrogen gas. In addition, the working gas 40 is selected according to the conductive polymer materials employed for the polymer layer 34.

Referring to FIG. 1, one of the sidewalls 35 includes two openings, i.e. a gas inlet 38 and a gas outlet 39, configured for introducing or discharging the working gas 40, respectively. The number and arrangement of the openings defined in the sidewalls 35 may have other modifications and is not limited to the illustrated embodiment. For example, the gas inlet 38 and the gas outlet 39 may be respectively defined in two different sidewalls 35. Alternatively, a single opening may be employed to server as the gas inlet 38 and the gas outlet 39. In using a single opening, the processes for introducing and discharging the working gas 40, however, cannot be performed at the same time. A pump 37 can advantageously be connected to the gas outlet 39 for increasing a gas-discharging speed and/or connected to the gas inlet 38 for increasing the gas-introduction rate (i.e., the pump can be used to control the working gas pressure within the gas chamber 36.).

In operation, the working gas 40 is introduced into the gas chamber 36 via the gas inlet 38, the working gas 40 coming directly into contact with the polymer layer 34. Under a relatively low voltage applied between the first and second electrodes 30, 32, a series of electrochemical oxidation-reduction reactions take place between the working gas 40 and the polymer layer 34. As a result, due to the electron transference on the molecular chain of the conductive polymer materials, new energy levels are created between the original band gaps of such materials, whereby the color of the electrochromic device 3 is changed accordingly. The working gas 40 is discharged out of the gas chamber 36 via the gas outlet 39.

Figure 2:
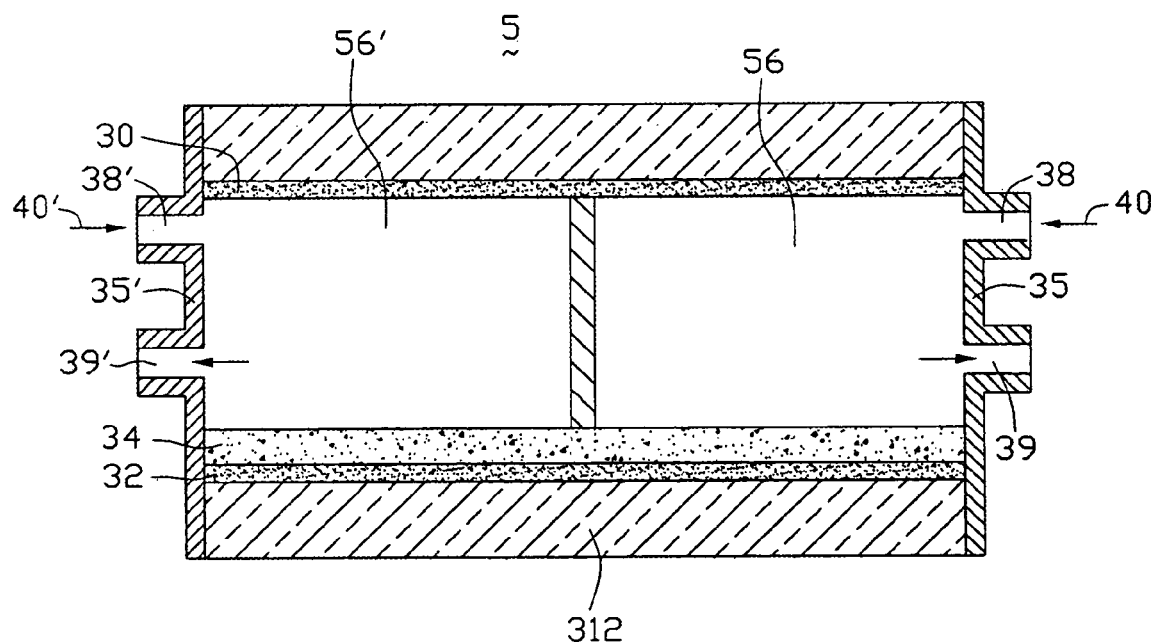
FIG. 2 is a schematic, simplified, cross-sectional view of an electrochromic device in accordance with an alternative embodiment of the present device.

Referring to FIG. 2, another electrochromic device 5 according to an alternative embodiment of the present device is shown. Compared with the above-mentioned electrochromic device 3, the main difference of the electrochromic device 5 is that the electrochromic device 5 includes two separate gas chambers 56, 56' for receiving different kinds of working gases 40, 40'. Accordingly, a sidewall 35' supporting the gas chamber 56' includes two openings, i.e. a gas inlet 38', a gas outlet 39', configured for introducing or discharging the working gas 40', respectively. In operation, the different working gases 40, 40' would be introduced into the corresponding gas chambers 56, 56', whereby the electrochromic device 5 would be enabled to display more complex color changes.

Furthermore, it should be noted that the electrochromic device 5 may include three or more separate gas chambers according to need. It is not limited to the illustrated embodiment.

Moreover, with either embodiment, the electrochromic device 3 or 5 is simple in structure and compact in size.

Finally, while the present invention has been described with reference to particular embodiments, the description is intended to be illustrative of the invention and is not to be construed as limiting the invention. Therefore, various modifications can be made to the embodiments by those skilled in the art without departing from the true spirit and scope of the invention as defined by the appended claims.

What is claimed is:

1. An electrochromic device comprising:
a first electrode;
an opposite second electrode, at least one of the first and second electrodes being light-permeable;
an electrically conductive polymer layer provided on the second electrode, the polymer layer facing the first electrode; and
a gas chamber arranged between the first electrode and the second electrode, the gas chamber being configured for receiving a working gas that is capable of having an electrochromic reaction with the polymer layer under an electric field applied by the first and second electrodes.

2. The electrochromic device as recited in claim 1, wherein the polymer layer is comprised of at least one material of polyacetylene, polypyrrole, and polyaniline.

3. The electrochromic device as recited in claim 1, wherein the working gas is one of an oxidizing gas and a reducing gas.

4. The electrochromic device as recited in claim 3, wherein the working gas is an oxidizing gas, the oxidizing gas comprising oxygen gas.

5. The electrochromic device as recited in claim 3, wherein the working gas is a reducing gas, the reducing gas comprising hydrogen gas.

6. The electrochromic device as recited in claim 1, wherein each of the first and second electrodes is comprised of a transparent conductive layer.

7. The electrochromic device as recited in claim 6, wherein the transparent conductive layer is comprised of indium-tin oxide.

8. The electrochromic device as recited in claim 1, wherein the gas chamber includes a working gas inlet and a working gas outlet.

9. The electrochromic device as recited in claim 8, further comprising a pump, the pump being connected to at least one of the working gas inlet and the working gas outlet.

10. The electrochromic device as recited in claim 1, wherein the gas chamber further includes a plurality of separate compartments.

11. An electrochromic device comprising:
   a first electrode;
   an opposite second electrode spaced apart from the first electrode; and
   an electrically conductive polymer layer provided on the second electrode, the polymer layer facing the first electrode, the polymer layer being capable of displaying electrochromic behavior, the first electrode and the polymer layer together defining a space therebetween; and
   a working gas received in the space between the first electrode and the polymer layer, wherein the working gas is chosen so as to be capable of having an electrochromic reaction with the polymer layer under an electric field applied by the first and second electrodes.

* * * * *